US011158216B2

(12) United States Patent
Van Der Vennet et al.

(10) Patent No.: US 11,158,216 B2
(45) Date of Patent: Oct. 26, 2021

(54) DISPLAY MODULE FOR A TEMPORARY EXHIBITION STAND

(71) Applicant: BEMATRIX BVBA, Roeselare (BE)

(72) Inventors: Edwin Van Der Vennet, Aalter (BE); Tom Pardon, Eppegem (BE)

(73) Assignee: BEMATRIX BVBA, Roeselare (BE)

( * ) Notice: Subject to any disclaimer, the term of this patent is extended or adjusted under 35 U.S.C. 154(b) by 0 days.

(21) Appl. No.: 16/472,522

(22) PCT Filed: Dec. 15, 2017

(86) PCT No.: PCT/IB2017/058000
§ 371 (c)(1),
(2) Date: Jun. 21, 2019

(87) PCT Pub. No.: WO2018/116101
PCT Pub. Date: Jun. 28, 2018

(65) Prior Publication Data
US 2019/0318670 A1    Oct. 17, 2019

(30) Foreign Application Priority Data
Dec. 23, 2016    (CN) .......................... 201621424986.6

(51) Int. Cl.
*G09F 9/302* (2006.01)
*F16M 13/02* (2006.01)
*G06F 1/16* (2006.01)

(52) U.S. Cl.
CPC .......... *G09F 9/3026* (2013.01); *F16M 13/022* (2013.01); *G06F 1/1637* (2013.01)

(58) Field of Classification Search
CPC ................................ H04N 9/12; H04N 9/3147
(Continued)

(56) References Cited

U.S. PATENT DOCUMENTS

| 2008/0263924 A1 | 10/2008 | Nearman et al. |
| 2016/0210886 A1* | 7/2016 | Brashnyk .............. G09F 9/3026 |
| 2016/0371047 A1* | 12/2016 | Cope ......................... G09F 9/30 |

FOREIGN PATENT DOCUMENTS

| BE | 1020560 A3 | 12/2013 |
| CN | 101533588 A | 9/2009 |

(Continued)

OTHER PUBLICATIONS

PCT, European Patent Office (ISA/EP), International Search Report, International Application No. PCT/IB2017/058000, 4 pages (dated May 2, 2018).

(Continued)

*Primary Examiner* — Jeff A Burke
*Assistant Examiner* — Sihar A Karwan
(74) *Attorney, Agent, or Firm* — Thompson Hine LLP

(57) ABSTRACT

The invention relates to a display module for a temporary exhibition stand. The display module comprises LED screens, a display frame and a signal receiver; wherein the display frame comprises a front face, a first, second, third and fourth lateral face and fixing surfaces are arranged on the display frame, a first set installation holes is formed in the lateral faces and a second set installation holes is formed in the fixing surfaces, wherein panels of LED screens are arranged on the front face of the display frame, and the LED screens are connected with the signal receiver. Modular connections and quick assembling and disassembling of the display frame are completed by connectors. These connectors are similar as the connectors used for connecting frame modules. The LED screens enable to display moving and dynamic images on the surface of the wall of the temporary exhibition stand.

22 Claims, 2 Drawing Sheets

(58) Field of Classification Search
USPC .......................................................... 348/383
See application file for complete search history.

(56) References Cited

FOREIGN PATENT DOCUMENTS

| CN | 201780736 U | 3/2011 |
|---|---|---|
| CN | 202871213 U | 4/2013 |
| CN | 202905058 U | 4/2013 |
| CN | 204406928 U | 6/2015 |
| CN | 204516320 U | 7/2015 |
| EP | 3091270 A1 | 11/2016 |
| WO | 2008/015762 A1 | 2/2008 |
| WO | 2012/086872 A1 | 6/2012 |
| WO | 2014/172848 A1 | 10/2014 |
| WO | 2016/109439 A1 | 7/2016 |

OTHER PUBLICATIONS

PCT, European Patent Office (ISA/EP), Written Opinion of the International Searching Authority, International Application No. PCT/IB2017/058000, 5 pages (dated May 2, 2018).
BE, Invalidity Analysis filed by Third Party, Beligan Patent Application No. 1025102, 21 pages (Apr. 4, 2019).
CN, English Translation of the Patent Invalidation Statement filed by Third Party, Chinese Utility Model Patent Application No. 201621424986.6, 5 pages (Feb. 7, 2018).
CN, English Translation of the Patent Reexamination Board of China National Intellectual Property Administration, Examination Decision on Request for Invalidation, Chinese Utility Model Patent Application No. 201621424986.6, 8 pages (Nov. 2, 2018).
CN, English Translation of the Administrative Complaint (Appealing the Decision of the Patent Reexamination Board of China National Intellectual Property Administration, Examination) filed on behalf of BEMATRIX, Chinese Utility Model Patent Application No. 201621424986.6, 16 pages (Jan. 21, 2019).
Leyard; "Leyard TWA series LED Vide Wall Installation Guide"; 73 pages (2016); as illustrated at https://www.youtube.com/watch?v=UyDzHX4HBKE (YouTube video upload date—Mar. 2016).
Mecanus; RocketSign, "RC2 Outdoor, model of 2015", 16 pages (2015); as illustrated at http://www.youtube.com/watch?v=3_VY8UL05xM (YouTube video upload date—Nov. 19, 2015).
LED Display, led screen, advertising led display I-Magic from Dicolor (3 pages), excerpted from YouTube video at https://www.youtube.com/watch?v=LGDUOPzfodw (Jun. 25, 2015).
Machine English translation of BE 1020560 A3 (above-cited Foreign Patent Document), Jun. 14, 2019.
Chauvet, "LLC DV Wall" User Manual, 22 pages, Feb. 5, 2007.
European Patent Office, Communication Pursuant to Rule 114(2) EPC, regardingp Third Party Observations, European Patent Application No. 17835869.3, 14 pages, dated Sep. 23, 2019.

* cited by examiner

DISPLAY MODULE FOR A TEMPORARY EXHIBITION STAND

BACKGROUND INFORMATION OF THE INVENTION

1. Field of the Technology

The disclosed invention relates to the field of modular exhibition stands, in particular to a display module for a temporary exhibition stand.

2. Prior Art

A modular temporary exhibition stand is a temporary building which consists of several walls and can be constructed or dismounted and removed rapidly when needed, wherein the main components have a modular design and are usually frame modules provided with installation holes. A frame module consists in the first place of a number of profiles and frame modules are assembled or disassembled through bolts and end fittings. The frame modules can be assembled flexibly and can be adjusted according to requirements defined in the design of the exhibition stand. After installation, display materials, panels, canvases and suchlike are assembled on the several walls of the exhibition stand in order to obtain the ideal layout.

In some cases, display screens are desired on the surface of one or more of the walls of the exhibition stand to improve the esthetic and visual effect of the exhibition stand. The display screens used in the exhibition stand should meet the requirements of a modular design. At present, there is not a good solution available in the industry to integrate display screens in temporary exhibition stands in a modular manner.

BRIEF SUMMARY OF THE INVENTION

The invention aims to provide a display module for a temporary modular exhibition stand in order to enable the modular installation of a display screen in a temporary exhibition stand.

Such a display module for a temporary exhibition stand comprising basic units, preferably frame modules, comprises LED screens, a display frame and a signal receiver; wherein the display frame comprises a front face, a first lateral face, a second lateral face, a third lateral face and a fourth lateral face, wherein the first lateral face is connected with the second and the fourth lateral face, the second lateral face is connected with the first and the third lateral face, the third lateral face is connected with the second and fourth lateral face and the fourth lateral face is connected with the first and the third lateral face and fixing surfaces are arranged on the display frame, characterized in that a first set installation holes is formed in the lateral faces and a second set installation holes is formed in the fixing surfaces, wherein panels of LED screens are arranged on the front face of the display frame, and the LED screens are connected with the signal receiver. An advantage of this invention is that the installation holes of the display module are compatible with the installation holes of the frame modules, which enables a fast and efficient assembly of a display module with a frame module or display modules with fasteners. The installation holes can be shaped differently, preferably circular, and at best, a finishing profile can be fixed on the installation hole.

In a preferred embodiment of the invention, a bracket, preferably cross-shaped, is arranged in the center of the display frame, fittings are arranged on the bracket, and the signal receiver is fixed on the bracket through the fittings. The bracket and fittings improve the fixation of the LED screens and the signal receiver to the display frame which is a big advantage. There is no screw needed for the fixation. Moreover, the bracket increases the stability and strength of the entire exhibition stand.

In a preferred embodiment of the invention, a plurality of magnets, in particular two, used for positioning the LED screens are arranged on the front face of the display frame.

A preferred embodiment of the invention comprises a groove used for assembling a back covering, on the inner side of at least one of the lateral faces of the frame module. In particular, this preferred embodiment enables a dynamic and esthetical finish of the exhibition stand. A tendon of a canvas can be applied in the groove to attach the canvas to the display frame.

According to a further preferred embodiment of the invention, a handle used for carrying and for crossing cables is provided in the lateral faces of the display frame. The advantage of this embodiment is that the temporary exhibition stand can be finalized in a dynamic and esthetic manner.

According to a further preferred embodiment of the invention, the number of LED screens is four, and the four LED screens are arranged according to a two by two matrix. This preferred embodiment enables to display moving and dynamic images on the surface of the wall of the exhibition stand. Moreover, the LED screens can be replaced separately when defect which is a big advantage.

In a preferred embodiment of the invention, fixing surfaces are provided in the four corners of the display frame and a second set of installation holes is formed in the fixing surfaces. An advantage of this embodiment is that the display module can be arranged to another display module or frame module at an angle to obtain a three-dimensional exhibition stand.

A preferred embodiment of the invention comprises hook-and-loop fasteners on the fixing surfaces. A beneficial aspect of this invention is that panels can be attached to the surface of the walls of the exhibition stand to finalize the construction esthetically.

According to a preferred embodiment of the invention, at least one installation hole of the first or second set of installation holes is formed and this installation hole defines a surface, in particular a circle, wherein the distance of the center of gravity of this surface to at least one of the nearby edges of the display frame almost equals half of the depth of the display module, in particular 31 mm.

According to a preferred embodiment of the invention, the length of at least one of the lateral faces of the display frame x is equal to a multitude of 4 times the distance y from the center of gravity of the surface defined by at least one of the installation holes of the first or second set of installation holes, in particular a circle, to at least one of the edges of the display frame. The advantage of this embodiment is that the compatibility with the frame module is enhanced because the same dimensions and ratios are used.

According to a preferred embodiment of the invention, at least one installation hole of the first or second set of installation holes is formed wherein the distance from the center of gravity of the surface defined by this installation hole, in particular a circle, to the nearest shared edge of two adjacent lateral faces almost equals half of the depth of the display module, in particular 31 mm.

In a preferred embodiment of the invention, the first or second set of installation holes comprises at least two installation holes and the distance between the centers of gravity of the surfaces defined by two installation holes of the first or second set of installation holes, in particular circles, is a multitude of the depth of the display module, in particular 62 mm.

In a preferred embodiment of the invention, at least one installation hole of the first or second set of installation holes wherein the center of gravity defined by the surface of this installation hole, in particular a circle, is formed at a distance x to at least one edge of the display frame and wherein the distance x=31+62n with x in millimeters and n is part of the natural numbers.

All of these preferred embodiments have the advantage of enhancing the modularity and versatility, namely the fixation of the display module to another display module or a frame module is possible in different ways and in different dimensions.

According to a preferred embodiment of the invention, the display modules and the frame modules are merged and assembled to each other by connectors, in particular bolts, through installation holes of the first or second set of installation holes of the display module.

According to a preferred embodiment of the invention, the depth of the display module is identical to the depth of the frame module, in particular 62 mm. An advantage of this preferred embodiment is that the display module can be easily and esthetically installed in a construction of frame modules.

Figure 1:
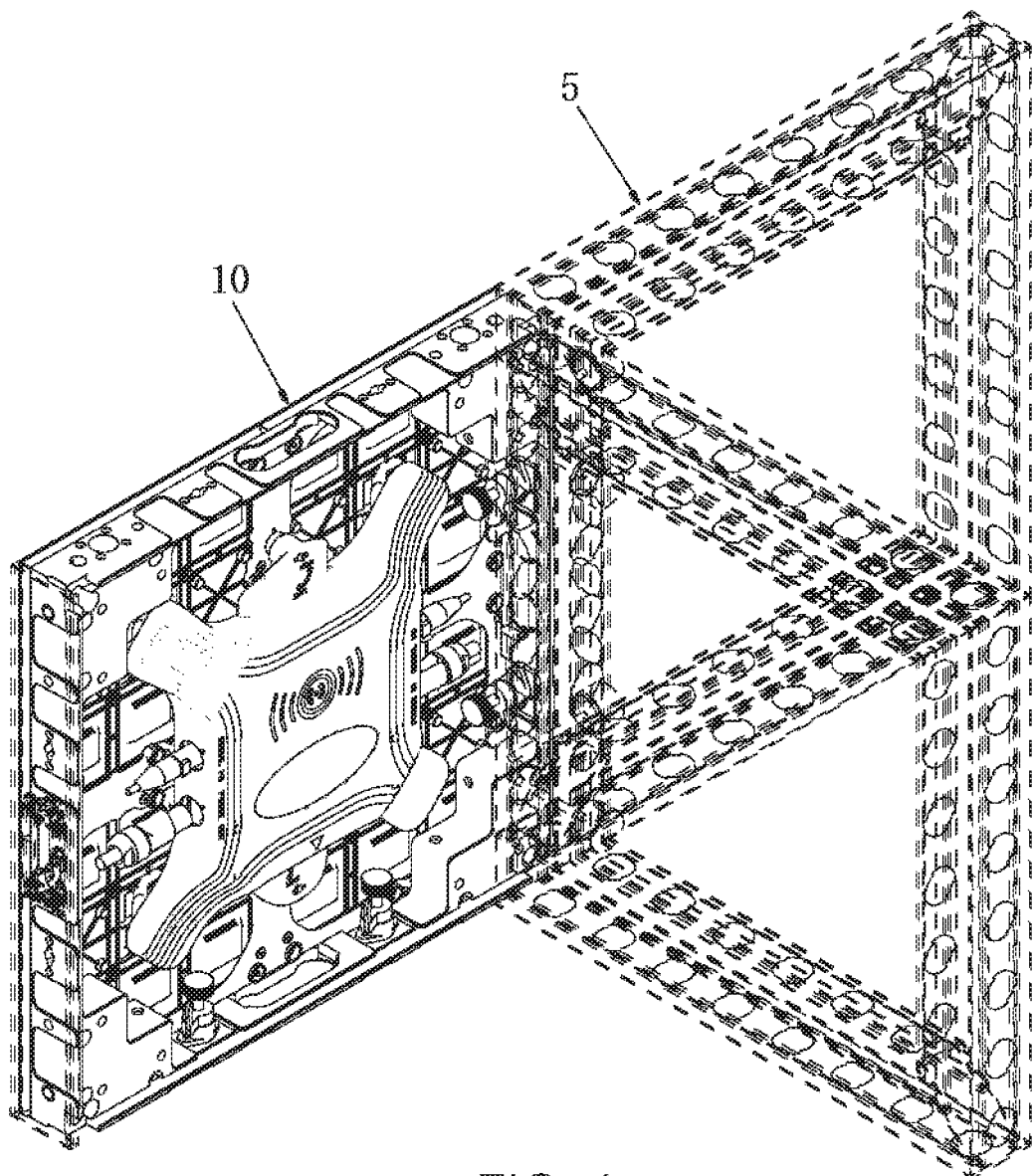
FIG. 1 is a schematic structural view of an embodiment of the invention.

Reference for the drawings: LED screen 1, display frame 2, bracket 21, bolt 22, signal receiver 3, first set installation holes 4, frame module 5, magnet 6, groove 7, handle 8, fixing surface 9, second set installation holes 91 and display module 10.

DETAILED DESCRIPTION OF THE INVENTION

The following detailed description aims to describe the preferred embodiment of the invention and is not a limited representation of the only embodiment of the invention. The detailed description strives to make the functionalities of the invention clear and is supported by the related drawings. People skilled in the art may make adjustments as needed, and all transformations or modifications made in the scope of the attached claims are included in the protection scope of the invention.

Figure 2:
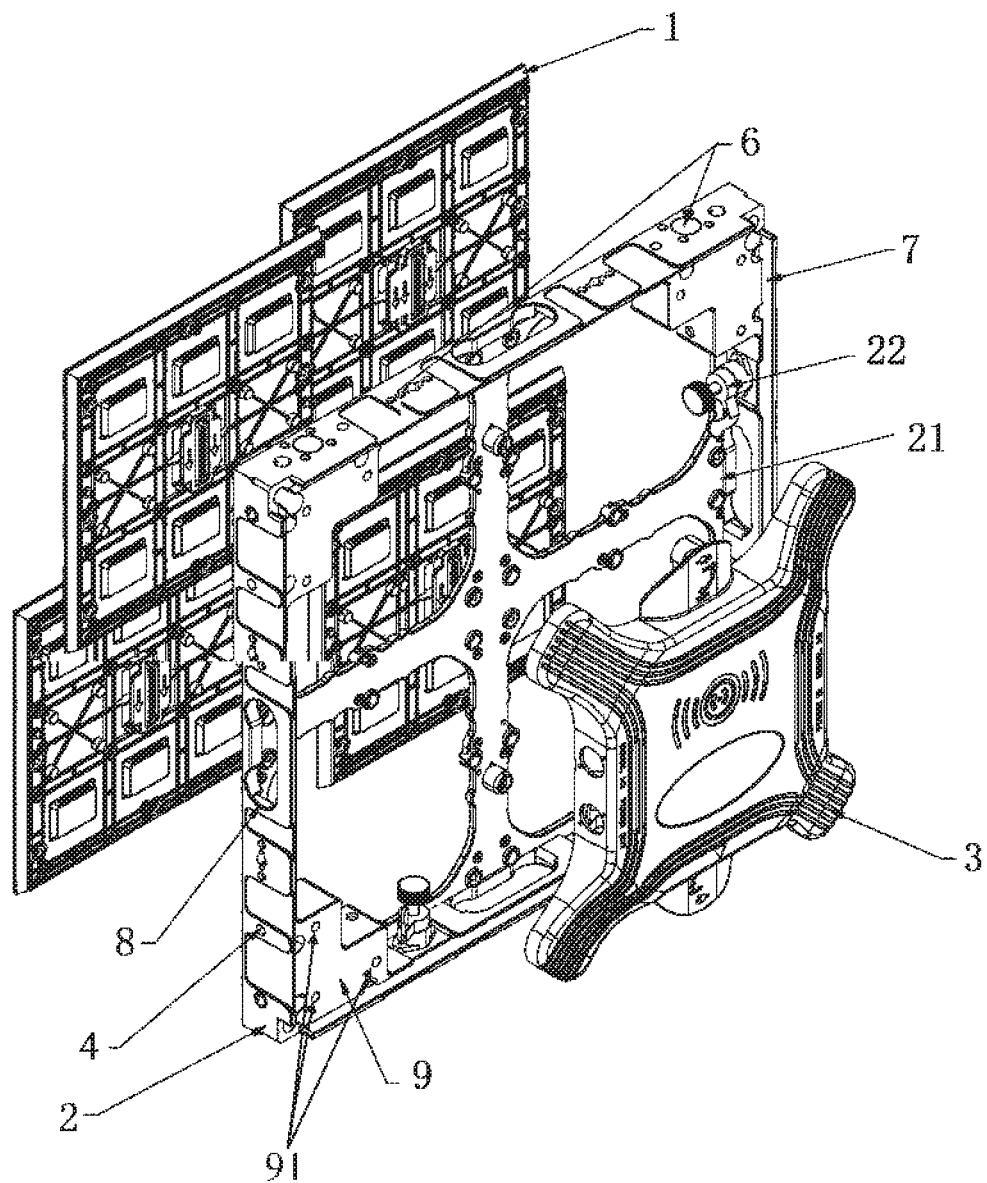
FIG. 2 is a schematic, structural spit diagram of an embodiment of the invention.

FIG. 1 and FIG. 2 show an embodiment of the present invention. A display module (10) for a modular temporary exhibition stand comprises four LED screens (1), a display frame (2) and a signal receiver (3), wherein the display frame (2) is a conventional rectangular frame. The shape of the display frame (2) is not unique and can be adapted, for example according to the shape of the frame module (5), and thereof all the structures fulfilling a modular function can be implemented according to the invention. Moreover the display frame (2) comprises a front face, a first lateral face, a second lateral face, a third lateral face and a fourth lateral face and fixing surfaces (9) are arranged on the display frame. These lateral faces are rectangular in the illustrated embodiment. However, at least one of these lateral faces can be shaped curved or randomly and these faces can be surfaces in a three-dimensional space.

According to an embodiment of the invention, installation holes of the first set installation holes (4) are formed in the lateral faces of the display frame (2), wherein the type of the installation holes (4) is the same as the type of the installation holes of the frame modules (5), which makes the connection between a display module (10) and a frame module (5), as well as a connection between multiple display modules (10) possible in an easy way. The connecting way is similar to the connecting way of frame modules (5), in particular through bolts (22) and nuts. In the embodiment, multiple installation holes of the first set of installation holes (4) are provided. These installation holes are formed at a specifically defined distance from the edges of the display frame to enhance the compatibility with the frame modules (5) and between display modules (10) in all dimensions and to provide more assembling locations. As shown in the drawings, the first installation hole of the first set of installation holes (4) is formed at a distance of 31 mm from the shared edge of two different lateral faces. Moreover, the distance between the installation holes in the embodiment is specifically defined, namely 62 mm. The installation holes are circular and the center of the installation holes is exactly positioned in the middle between the two longest edges of the lateral face, namely at 31 mm of two of the four edges of the lateral face.

In an embodiment, the panels of the four LED screens (1) are arranged on the front face, namely the side faced towards the audience, of the display frame (2), in particular in the form of a two by two matrix and all the LED screens (1) are connected with the signal receiver (3) on the back face of the display frame (2). The brightness of the LED screens in the embodiment can reach between 600 and 12.000 nits, in particular the brightness is around 1.200 nits.

In the embodiment as shown in the drawings, a bracket (21) is provided in the center of the display frame (2). In the embodiment, the bracket (21) is cross-shaped and extends across two lateral faces of the display frame (2), wherein a plurality of circular fittings are arranged on the back face of the bracket (21), and wherein the front face of the signal receiver (3) can be fixed on the bracket (21) through the fittings. These fittings are, in their simplest form, mechanical connection points used for connecting elements. In particular, during the connection of elements through the mechanical connection points, screws are not required and the connection process is quick and effective. Moreover, the cross-shaped structure of the bracket supports the LED screens separately and enhances the bearing strength of the entire exhibition stand.

In the embodiment as shown in the drawings, a plurality of magnets (6) are further provided on the front face of the display frame (2) used for positioning of the LED screens (1). The magnets (6) attract the LED screens (1) in order to simplify the positioning and the installation.

To build a temporary exhibition stand, first a design is made wherein the positioning of the display modules (10) and frame modules (5) is defined. During the construction of the exhibition stand, the display modules (10) and frame modules (5) are positioned according the design and the installation holes of the display module are aligned with the corresponding installation holes of the frame modules or other display modules. The positioning of the modules is simplified by magnets on the outside of the lateral faces of the display module (10) or frame module (5). In the embodiment, the bearing strength of the magnets is higher than the mass of the display module (10) which makes it possible to easily build the exhibition stand from the top to the bottom. After positioning, the bolts (22), in particular M8-bolts, sequentially penetrate through the installation holes to complete the connection. After connecting the corresponding positions, the connection of a display module (10) and a frame module (5) or two display modules (10) is completed. At the time of disassembly of the display module (10), the bolts (22), in particular M8-bolts, are loosened sequentially. Since the installation holes in the embodiment are compatible with the installation holes in the frame module (5), the bolts used to make the connection are the same as used for the connection of two frame modules and the assembling process of a display module (10) and a frame module (5) or two display modules (10) is the same as the assembling process of two frame modules (5). No additional components or tools are needed. Consequently, the display module (10) has universal and modular features and can be rapidly assembled and disassembled.

For certain temporary exhibition stands, a display screen with a surface area larger than the surface area of one display module (10) is desired. Multiple display modules (10) can be connected together to further extend the versatility of the display module (10).

In the embodiment a groove, used for mounting a back covering, is provided on the inner side of at least one of the lateral faces of the display frame. The back covering is usually a textile or fabric and is mounted to obtain an esthetical finish and to hide the cabling. The groove is provided in the same manner in the display module as in the frame module wherein the profiles are described in the Belgian patent application with patent number 1020560A3.

In the embodiment, a handle used for carrying and for crossing cables, is provided in the lateral faces of the display frame (2). Preferably, the shape of the handle is based on the shape of an installation hole of the first set of installation holes. Further, a cover clip can be mounted onto the handle (8) and a cover profile can be mounted onto the display frame (2) to achieve a finished side of the display module (10).

In the embodiment, fixing surfaces (9) are provided in the four corners of the display frame (2), and strips of hook-and-loop fasteners are arranged on the fixing surfaces (9). The hook-and-loop fasteners enable an esthetical finishing of the exhibition stand with panels or other profiles.

In the embodiment, multiple installation holes of the second set of installation holes (91) are provided in the fixing surfaces (9). The installation holes are formed at a specific defined distance from the edges of the display frame. In an embodiment of the invention, the installation holes (91) are circular and the centers of the installation holes (91) are at a distance of 31 mm from at least one of the edges of the display frame (2). This second set of installation holes (91) enables the integration of the display module (10) in a three-dimensional exhibition stand.

In the embodiment as shown in the drawings, the depth of the display module (10) is 62 mm, which is equal to the depth of the frame module (5). Consequently, the display module (10) and frame module (5) can be easily connected next to each other. In the embodiment as shown, the display module (10) and frame module (5) have the same projected area and the same shape, which enables substitution of a frame module (5) with a display module (10) or vise versa. Since the depth is small, transportation costs and storage space can be reduced.

Components, such as the display frame (2), the bracket (21), etc. are preferably made of magnesium-aluminum alloy, but can also be made of aluminum-, magnesium- or carbon alloy, so that the display module (10) weighs less than 30 kg per square meter. Although the display module (10) is heavier than the frame module (5), it is still light and handy.

Preferably, the length of at least one of the lateral faces of the display frame x equals a multitude of 4, namely 4; 8; 12; 16; 20; 24; . . . ; times the distance y of the center of gravity of the surface defined by at least one of the installation holes, in particular a circle, of the first (4) or second set of installation holes (91) to at least one of the edges of the display frame. In the embodiment shown on the drawings, the length of the lateral faces is 496 mm, the middle points of the circular installation holes are formed at a distance 31 mm from at least one of the edges of the display frame and 496 mm equals 16, or 4 times 4, times 31 mm.

In an embodiment, the front face is defined as the surface of the display frame (2) at which the LED screens are attached, this is in the preferred embodiment the side faced towards the audience. The faces shown in the drawings, being the front face, the back face and the lateral faces of the display frame (2) are flat or two-dimensional. However, in another embodiment of the invention, these faces can be three-dimensional faces that can be statically formed or dynamically deformed. In particular, it is possible to dynamically deform the whole display module (10).

The invention claimed is:

1. A display module for a modular temporary exhibition stand comprising a plurality of frame modules (5) serving as basic units, wherein the display module comprises
LED screens (1),
a display frame (2) and
a signal receiver (3),
wherein the display frame comprises
a front face,
a back face, and each of
a first lateral face,
a second lateral face,
a third lateral face and
a fourth lateral face each extending from the front face to the back face,
wherein the first lateral face is connected with both the second lateral face and the fourth lateral face, the second lateral face is connected with both the first lateral face and the third lateral face, the third lateral face is connected with both the second lateral face and the fourth lateral face, and the fourth lateral face is connected with both the first lateral face and the third lateral face, and fixing surfaces (9) are arranged on the display frame (2), and a first set installation holes (4) is formed in each of the first lateral face, the second lateral face, the third lateral face, and the fourth lateral face, and a second set of installation holes (91) is formed in the fixing surfaces, wherein the LED screens are arranged on the front face of the display frame, and the LED screens are connected with the signal receiver (3).

2. The display module for the modular temporary exhibition stand according to claim 1, wherein a bracket (21), is arranged in the center of the display frame, fittings are arranged on the bracket, and the signal receiver (3) is fixed on the bracket through the fittings.

3. The display module for the modular temporary exhibition stand according to claim 1, wherein a plurality of magnets used for positioning the LED screens (1) are arranged on the front face of the display frame (2).

4. The display module for the modular temporary exhibition stand according to claim 1, wherein a handle (8), used for carrying and for crossing cables, is provided in the lateral faces of the display frame.

5. The display module for the modular temporary exhibition stand according to claim 1, wherein the number of LED screens (1) is four and wherein the four LED screens (1) are arranged according to a two by two matrix.

6. The display module for the modular temporary exhibition stand according to claim 1, wherein the fixing surfaces (9) are provided in the four corners of the back face of the display frame.

7. The display module according to claim 6, wherein hook-and-loop fasteners are arranged on the fixing surfaces (9).

8. The display module for the modular temporary exhibition stand according to claim 1, wherein at least one respective installation hole of the first (4) set of installation holes defines a respective opening in a respective surface of each of the first lateral face, the second lateral face, the third lateral face, and the fourth lateral face, and wherein the distance of the centroid of this respective opening to at least one of the nearest edge of the respective surface equals half of the depth of the display module.

9. The display module for the modular temporary exhibition stand according to claim 1, wherein the length x of at least one of the first lateral face, the second lateral face, the third lateral face, and the fourth lateral face of the display frame equals a multiple of 4 times the distance y from the centroid of an opening defined in that face by at least one of the installation holes of the first (4) set of installation holes to at least one of the nearest edge of that surface.

10. The display module for the modular temporary exhibition stand according to claim 1, wherein at least one respective installation hole of the first set of installation holes (4) is formed in each one of the first lateral face, the second lateral face, the third lateral face, and the fourth lateral face and wherein the distance from the centroid of a respective opening defined by this respective installation hole to the nearest shared edge of two adjacent ones of the aforementioned lateral faces almost equals half of the depth of the display module.

11. The display module for the modular temporary exhibition stand according to claim 1, wherein the first (4) set of installation holes comprises at least two respective installation holes formed in each one of the first lateral face, the second lateral face, the third lateral face, and the fourth lateral face, and the distance between the centroids of respective openings defined by the at least two respective installation holes in a respective surface of the aforementioned lateral faces is a multiple of the depth of the display module.

12. The display module for the modular temporary exhibition stand according to claim 1, wherein at least one respective installation hole of the first (4) set of installation holes defines a respective opening in a respective surface of each of the first lateral face, the second lateral face, the third lateral face, and the fourth lateral face, and wherein the centroid of this respective opening is at a distance x to at least one edge of the respective surface and wherein the distance is x=31+62n with x in millimeters and wherein n is part of the natural numbers.

13. The display module for the modular temporary exhibition stand according to claim 1, wherein the display modules (10) and the frame modules (5) are merged and assembled to each other by connectors through installation holes of the first (4) or second set (91) of installation holes of the display module (10).

14. The display module for the modular temporary exhibition stand according to claim 13, wherein the depth of the display module is equal to the depth of the frame module.

15. The display module for the modular temporary exhibition stand according to claim 3, wherein the plurality of magnets is two magnets.

16. The display module for the modular temporary exhibition stand according to claim 13, wherein the connectors are bolts.

17. The display module for the modular temporary exhibition stand according to claim 1, wherein the display frame includes a groove (7), used for mounting a back covering, on the inner side of at least one of the lateral faces of the display frame.

18. A modular temporary exhibition stand comprising at least one display module (10) and at least one frame module (5), wherein the at least one display module comprises
LED screens (1),
a display frame (2) and
a signal receiver (3),
wherein the display frame comprises
a front face,
a back face, and each of
a first lateral face,
a second lateral face,
a third lateral face and
a fourth lateral face each extending from the front face to the back face,
wherein, with respect to the display frame, the first lateral face is connected with both the second lateral face and the fourth lateral face, the second lateral face is connected with both the first lateral face and the third lateral face, the third lateral face is connected with both the second lateral face and the fourth lateral face, and the fourth lateral face is connected with both the first lateral face and the third lateral face, and a first set installation holes (4) is formed in each of the first lateral face, the second lateral face, the third lateral face, and the fourth lateral face, and a second set of installation holes (91) opening in the direction of the back face is formed in the fixing surfaces, the LED screens are arranged on the front face of the display frame, and the LED screens are connected with the signal receiver (3), and
wherein the at least one frame module (5) comprises
a front face,
a back face, and each of
a first lateral face,
a second lateral face,
a third lateral face and
a fourth lateral face each extending from the front face to the back face,
wherein, with respect to the frame module, the first lateral face is connected with both the second lateral face and the fourth lateral face, the second lateral face is connected with both the first lateral face and the third lateral face, the third lateral face is connected with both the second lateral face and the fourth lateral face, and the fourth lateral face is connected with both the first lateral face and the third lateral face, and a first set installation holes (4) is formed in each of the first lateral face, the second lateral face, the third lateral face, and the fourth lateral face, wherein the first (4) and second (91) set of installation holes of the at least one display module are compatible with the first set of installation holes of the at least one frame module, and wherein a respective display module and a respective frame module are merged and assembled to each other by connectors through installation holes of the first (4) or second (91) set of installation holes of the respective display module (10) and the first set of installation holes of the respective frame module.

19. The modular temporary exhibition stand of claim 18 wherein one of the first lateral face, the second lateral face, the third lateral face, and the fourth lateral face of the respective display module is secured in abutting relationship to one of the first lateral face, the second lateral face, the third lateral face, and the fourth lateral face of the respective frame module by connectors through installation holes of the first (4) set of installation holes of the respective display module and the first set of installation holes of the respective frame module.

20. The modular temporary exhibition stand of claim 19 wherein a rear face of the respective display module is secured in abutting relationship to one of the first lateral face, the second lateral face, the third lateral face, and the fourth lateral face of another respective frame module by connectors through installation holes of the second (91) set of installation holes of the respective display module and the first set of installation holes of the respective frame module.

21. A modular temporary exhibition stand comprising at least two display modules (10), wherein each of the at least two display modules comprise:

LED screens (1), a display frame (2) and a signal receiver (3), wherein the display frame comprises a front face, a back face, and each of a first lateral face, a second lateral face, a third lateral face and a fourth lateral face each extending from the front face to the back face, wherein, with respect to each display frame, the first lateral face is connected with both the second lateral face and the fourth lateral face, the second lateral face is connected with both the first lateral face and the third lateral face, the third lateral face is connected with both the second lateral face and the fourth lateral face, and the fourth lateral face is connected with both the first lateral face and the third lateral face, and a first set installation holes (4) is formed in each of the first lateral face, the second lateral face, the third lateral face, and the fourth lateral face, and a second set of installation holes (91) opening in the direction of the back face is formed in the fixing surfaces, the LED screens are arranged on the front face of the display frame, and the LED screens are connected with the signal receiver (3), wherein the first (4) and second (91) set of installation holes of each of the at least two display modules are compatible with those of the others of the at least two display modules, and wherein a first of the at least two display modules and a second of the at least two display modules are merged and assembled to each other by connectors through installation holes of the first (4) or second (91) set of installation holes of the first and second of the at least two display modules.

22. The display module for the modular temporary exhibition stand according to claim 2, wherein the bracket (21) is cross-shaped.

* * * * *